(12) United States Patent
Courbis

(10) Patent No.: US 11,326,719 B2
(45) Date of Patent: May 10, 2022

(54) DEVICE FOR SECURING AN ELEMENT ON A PIPE, SECURING SYSTEM, INSTALLATION AND IMPLEMENTATION METHOD

(71) Applicant: Financiere de Beaumont—FBD, Romans-sur-Isère (FR)

(72) Inventor: Hervé Guy Claude Courbis, Beaumont Monteux (FR)

(73) Assignee: Financiere de Beaumont—FBD, Romans-sur-Isère (FR)

( * ) Notice: Subject to any disclaimer, the term of this patent is extended or adjusted under 35 U.S.C. 154(b) by 0 days.

(21) Appl. No.: 16/716,522

(22) Filed: Dec. 17, 2019

(65) Prior Publication Data
US 2020/0224797 A1    Jul. 16, 2020

(30) Foreign Application Priority Data
Dec. 21, 2018   (FR) ...................................... 1873856

(51) Int. Cl.
*F16L 3/137*   (2006.01)
*F16L 3/12*    (2006.01)

(52) U.S. Cl.
CPC ............. *F16L 3/137* (2013.01); *F16L 3/1211* (2013.01)

(58) Field of Classification Search
CPC . F16L 3/137; F16L 3/1211; F16L 3/00; F16L 3/233; F16L 3/1058; F16B 2/08;
(Continued)

(56) References Cited

U.S. PATENT DOCUMENTS 3,086,369 A * 4/1963 Brown ................... C23F 13/04
                                                       405/172
4,235,404 A * 11/1980 Kraus ..................... F16L 3/233
                                                        248/74.3
(Continued)

FOREIGN PATENT DOCUMENTS

DE    102004053863   5/2006
EP       1965116     9/2008
FR       3059059     5/2018

OTHER PUBLICATIONS

Preliminary Search Report and Written Opinion dated Sep. 16, 2019 From the Institut National de la Propriete Industrielle, INPI de la Republique Francaise Re. Application No. FR 1873856. (6 Pages).

*Primary Examiner* — Christopher Garft

(57) ABSTRACT

This invention relates to a device (1) for securing an element (2) to a pipe (4), the device (1) comprising: a compensating member (10) made of an elastic material, extensible when the device (1) is tensioned around the pipe (4) with a strap (6), and progressively shrinkable over time to keep the device (1) and the strap (6) in tension when the pipe (4) shrinks; two clamping buckles (20, 30) each designed to receive a free end (62, 63) of the strap (6); and two strands (40, 50) made of a material less elastic than the compensating member (10), and each extending between a first end (41, 51) integral with the compensating member (10) and a second end (42, 52) integral with one of the clamping buckles (20, 30). The invention also relates to a system (1, 6) comprising such a device (1) and a strap (6); an installation (1, 2, 3, 4, 6) comprising such a system (1, 6); and a method for operating such a system (1).

13 Claims, 4 Drawing Sheets

(58) Field of Classification Search
CPC .......... F16B 7/0433; B65D 63/16; B62J 7/08; Y10T 24/142; Y10T 24/1498; A41C 1/00
See application file for complete search history.

(56) References Cited

U.S. PATENT DOCUMENTS

| | | | | |
|---|---|---|---|---|
| 5,040,751 | A | * | 8/1991 | Holub .................. F16L 3/11 248/62 |
| 6,138,327 | A | * | 10/2000 | Powell ............. B29C 45/14467 24/298 |
| 6,330,989 | B1 | * | 12/2001 | Okamoto ............... B62M 25/02 248/65 |
| 2004/0237264 | A1 | | 12/2004 | Shaw |
| 2009/0126162 | A1 | * | 5/2009 | Head .................. F16L 3/233 24/115 K |
| 2009/0172921 | A1 | * | 7/2009 | Vermeer ............ B65D 63/1072 24/16 PB |
| 2010/0223763 | A1 | * | 9/2010 | Shilale ............... B65D 63/1072 24/16 PB |
| 2011/0233377 | A1 | * | 9/2011 | Luo .................. F16L 41/008 248/689 |
| 2015/0026955 | A1 | * | 1/2015 | Rodrigue ................ F16L 3/237 248/72 |

* cited by examiner

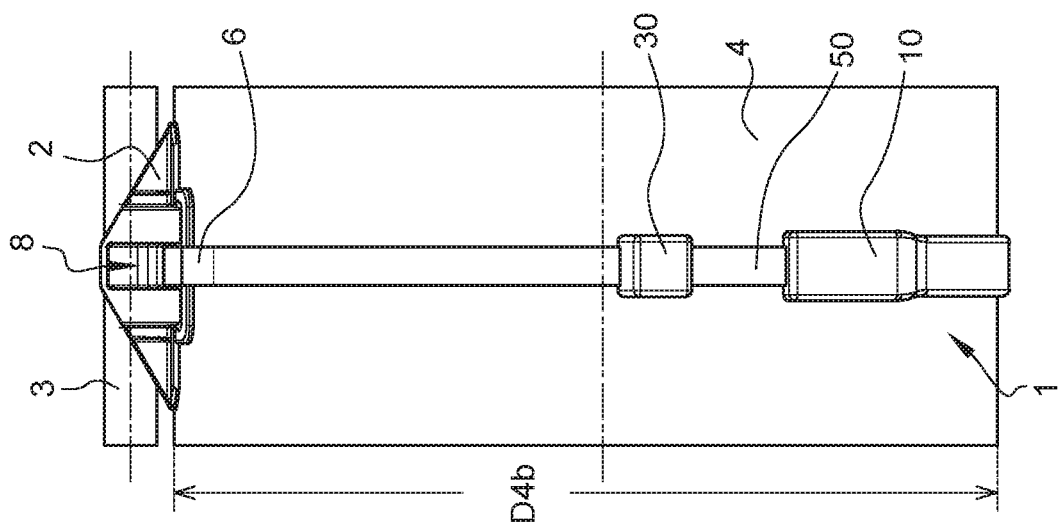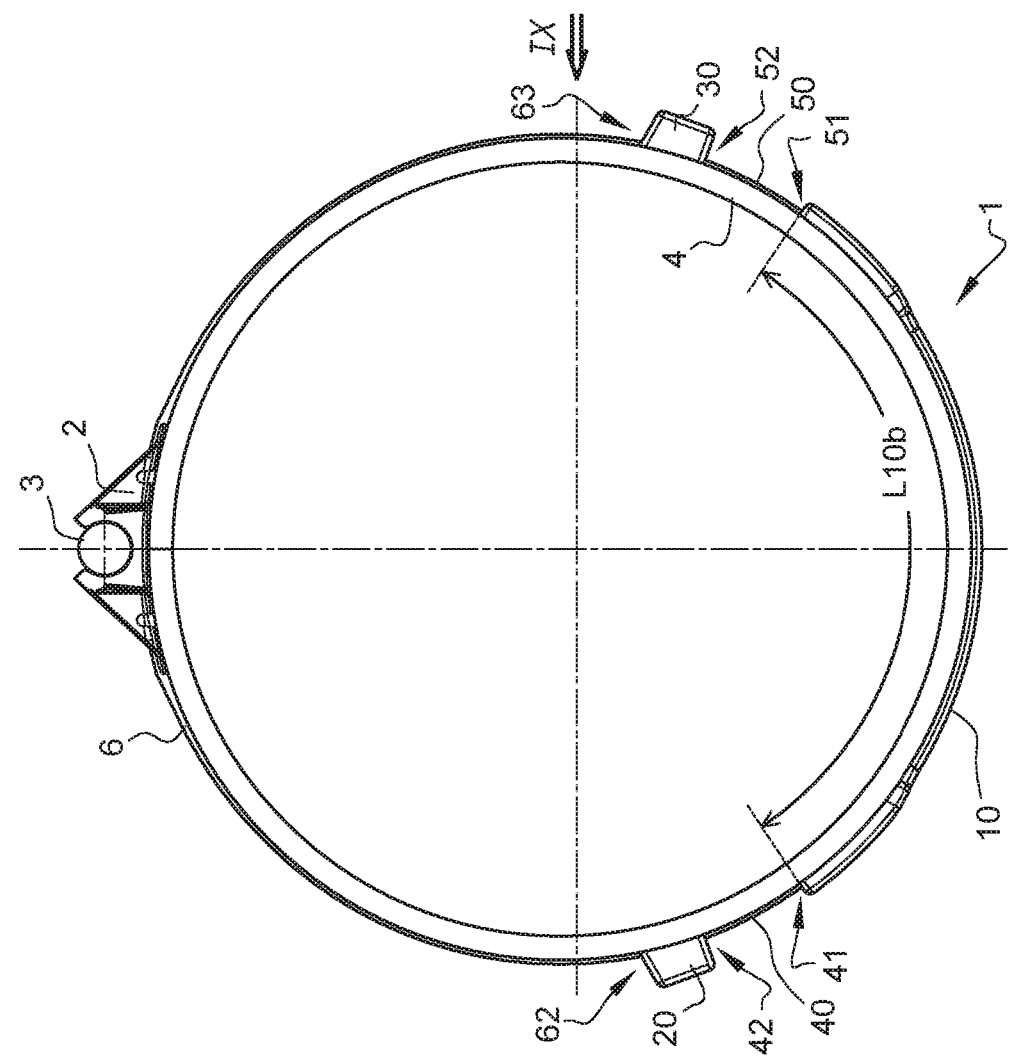

DEVICE FOR SECURING AN ELEMENT ON A PIPE, SECURING SYSTEM, INSTALLATION AND IMPLEMENTATION METHOD

RELATED APPLICATION

This application claims the benefit of priority of French Patent Application No. 1873856 filed on Dec. 21, 2018, the contents of which are incorporated herein by reference in their entirety.

FIELD AND BACKGROUND OF THE INVENTION

This invention relates to a device for securing a strap, to secure an element to a pipe. The invention also relates to a securing system comprising such a device and a strap; an installation comprising such a system; and a method of implementing such a system.

The invention relates to the field of pipes, such as underwater pipelines for transporting hydrocarbons.

In this field, it is known to fasten various elements along pipes, which may extend over several hundreds of kilometers, on land, underground and/or underwater. As non-limiting examples, these elements may be electrical cables, sensors, or supports for fastening cables. Regarding this last example, it is in fact preferable to insert a support element between the pipe and the cables.

In practice, the element secured on the pipe must remain in place throughout the entire lifetime of this pipe, for example 25 years. The element submerged at a depth must withstand the pressures, temperature variations, currents, marine fauna and flora, etc.

Furthermore, it is remarkable that the submerged pipe gradually shrinks over time under the effect of the stresses to which it is subjected, i.e., its diameter gradually shrinks. If an element is secured on the pipe using a tensioned strap, then the tension in the strap relaxes when the pipe shrinks, such that the element is no longer kept in place.

Document FR 2,965,252 describes an example securing system, designed to fasten a load on a transport vehicle. This system comprises a strap and a tension loss compensating device. However, this system has a complex construction and is not suitable for fastening an element on a submerged pipe.

Document FR 3 059 059 describes another example of a securing system developed by the Applicant. This system comprises a device comprising a compensating member made of an elastic material, and two strands capable of forming a strap around the pipe. This system also comprises means of joining the two strands. Based on the length of the member and the strands, each device is adapted to a particular pipe perimeter.

SUMMARY OF THE INVENTION

The aim of the present invention is to propose a device for resolving the above drawbacks.

To that end, the subject of the invention is a device for securing an element on a pipe, the device comprising:
- a compensating member made of an elastic material, extensible when the device is tensioned around the pipe with a strap, and progressively shrinkable over time to keep the device and strap in tension when the pipe shrinks;
- two clamping buckles designed to receive each a free end of the strap; and
- two strands made of a material less elastic than the compensating member, each extending between a first end integral with the compensating member and a second end integral with one of the clamping buckles.

The device makes it possible to compensate for the loss of tension in the strap due to the shrinkage of the pipe, and to keep the element secured on the pipe. The compensating member makes it possible to provide flexibility and elasticity to the securing system consisting of the device and the strap, compared to a system consisting only of a strap.

The clamping buckles allow the strap to be easily and conveniently received and tightened. The length of the strap can easily be adjusted according to the perimeter of the pipe. Thus, the device can be used for all pipe sizes, with great versatility.

The invention makes it easier to secure one or more elements along a pipe, over a great length, simply with a set of devices and a strap roll.

According to other advantageous features of the invention, considered alone or in combination:
- The device has no metal part.
- The compensating member is overmolded on the first ends of the strands.
- The first ends of the strands comprise recesses receiving material of the compensating member during overmolding.
- The recesses comprise hollows formed alternating between slots.
- The recesses comprise openings between two opposite sides of the strands.
- The first end of each strand is directly attached to the compensating member, without any intermediate piece.
- The second end of each strand is directly attached to one of the clamping buckles, without any intermediate piece.
- The clamping buckle and the associated strand form a single piece.
- The clamping buckle and the associated strand are made of the same material.
- The clamping buckle is overmolded on the associated strand.
- The device solely comprises the compensating member, the two clamping buckles designed to receive the strap, and the two strands.
- In a longitudinal direction of the device at rest, each of the two strands is shorter than the compensating member.
- The device comprises a single compensating member.
- The compensating member is a one-piece unit made of a single piece of plastic material.
- The compensating member comprises a median portion and two end portions receiving the first ends of the strands, the end portions having cross-sections larger than the cross-section of the median portion.
- The compensating member comprises intermediate portions having cross-sections varying gradually between the median portion and the end portions.
- The compensating member is made of polyurethane, preferably a polyurethane elastomer.
- The clamping buckles are made of a thermoplastic material.
- The strands are made of a thermoplastic material.

The invention also relates to a securing system, comprising: a device as mentioned above, and a strap intended to cooperate with the device for securing an element to a pipe.

Preferably, the system comprises a set of devices and a strap roll. This allows the user to easily secure one or more elements along the pipe over a significant length.

The invention also relates to an installation, comprising: at least one securing system as mentioned above, at least one element intended to be secured to a pipe by implementing the system, at least one piece fastened to the element, and the pipe supporting the system, the element and the piece.

The object of the invention is also a method for implementing a securing system such as that described above. The method is characterized in that it comprises the following successive steps:
  a) assembling the system around the pipe, placing the free ends of the strap in the device's clamping buckles;
  b) tightening the device and the strap around the pipe, thereby stretching the compensating member; then
  c) when the pipe gradually shrinks over time, the compensating member also shrinks, so that the device and the strap are held in tension around the pipe.

According to a specific embodiment, the pipe is intended to be submerged. The securing system is submersible. The compensating member can gradually shrink over time to keep the device and strap tensioned when the pipe shrinks in immersion.

According to another specific embodiment, the pipe is intended to be buried. The compensating member can gradually shrink over time to keep the device and strap tensioned when the pipe shrinks underground.

BRIEF DESCRIPTION OF THE SEVERAL VIEWS OF THE DRAWINGS

The invention will be better understood upon reading the following description, given solely as a non-limiting example, and made with reference to the accompanying figures wherein:

FIG. 8 is a view similar to that of FIG. 6, showing the pipe and the device which shrunk after several years of use; and FIG. 9 is a side view according to arrow IX from FIG. 8.

DESCRIPTION OF SPECIFIC EMBODIMENTS OF THE INVENTION

Figure 1:
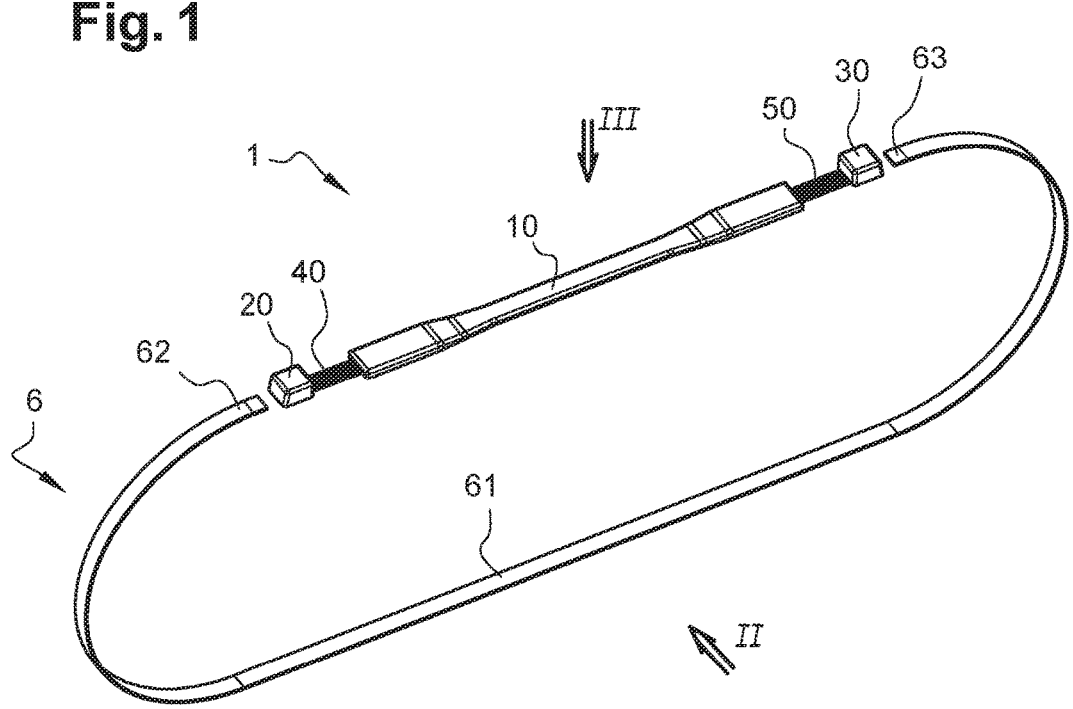
FIG. 1 is a perspective view of a securing system in accordance with the invention, comprising a fastening device and a strap.
Figure 2:
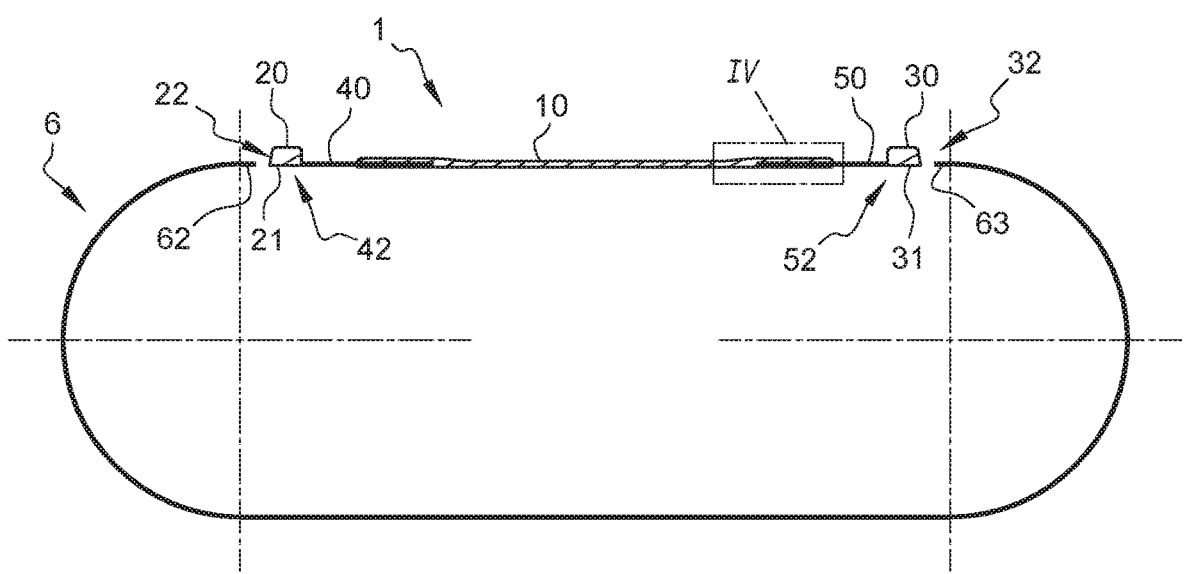
FIG. 2 is a front view of the system, according to arrow II in FIG. 1.
Figure 3:
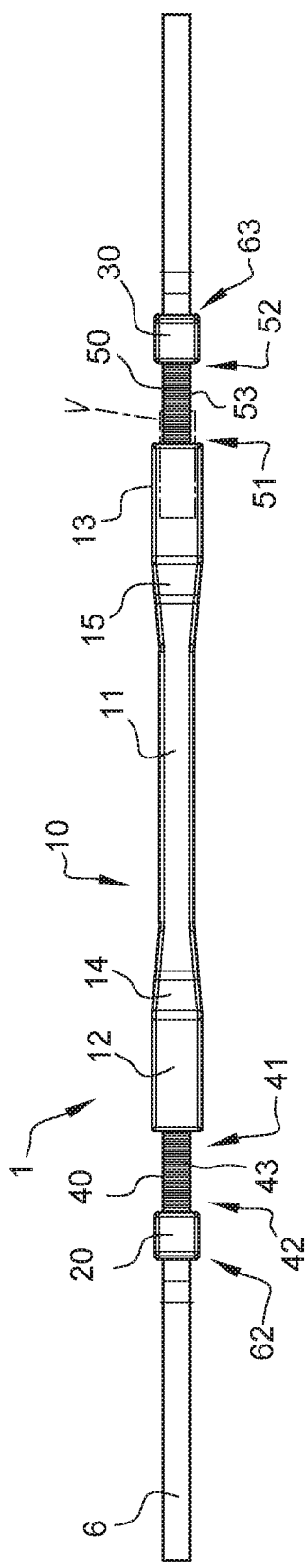
FIG. 3 is a top view of the system, according to arrow III in FIG. 1.

FIGS. 1 to 9 show a securing device 1 according to the invention. The device 1 comprises a compensating member 10, two clamping buckles 20 and 30, and two strands 40 and 50 connecting the member 10 to the buckles 20 and 30.

The device 1 is designed to cooperate with a strap 6, in order to secure an element 2 to a pipe 4. The strap 6 is elongated between two free ends 62 and 63 connected by a running part 61. The device 1 is used to fasten the strap 6 around the pipe 4.

In FIGS. 1 to 5, the device 1 is shown idle, with no mechanical stress exerted on its constituent elements.

In FIGS. 6 to 9, the device 1 and the strap 6 are shown during use, in the context of securing a cable 3 support element 2 on a pipe 4.

The element 2 is in a single piece, formed from a single piece of plastic. The element 2 is secured on the pipe 4 using the device 1 and the strap 6, in particular owing to the passage of the strap 6 through an opening 8 arranged for that purpose in the element 2.

Alternatively, element 2 can be of any other type adapted to the intended application. According to a variant, element 2 can support several cables 3. Instead of a cable 3, element 2 can receive any other type of piece, generally elongated, such as a sheath or a hose.

The cable 3 can be a power cable or a digital data transfer cable.

The pipe 4 is a metal tube, preferably covered with an insulating layer, for example made from polypropylene.

The member 10 is in a single piece, formed from a single piece of plastic. Preferably, the member 10 is a polyurethane elastomer, as known under the brand COURBHANE by the Applicant.

The member 10 comprises a median portion 11, two end portions 12 and 13, and two intermediate portions 14 and 15 formed between the median portion 11 and the end portions 12 and 13, respectively. The member 10 includes a lower surface 16 that extends over its entire length and is intended to come to bear against the outer surface of the pipe 4.

Preferably, the member 10 is symmetrical relative to a transverse central plane. Therefore, portion 12 has the same dimensions as portion 13, and portion 14 has the same dimensions as portion 15.

In a longitudinal direction, portion 11 is more elongated than portions 12 and 13, which are themselves more elongated than portions 14 and 15. In height and width, portion 11 is lower and narrower than portions 12 and 13. Therefore, portion 11 has a smaller cross-section than portions 12 and 13. Portions 14 and 15 have variable heights and widths. The shapes of all of the cross-sections of the portions 11-15 are parallelepipeds.

Due to its smaller dimensions, and therefore its lower mechanical strength, it is primarily the portion 11 that is stretched when the member 10 is subject to tensile stresses on its two end portions 12 and 13.

Clamping buckles 20 and 30 are made from a rigid, inelastic material under normal temperature and pressure conditions (NTPC). Buckles 20 and 30 can be made of metal or plastic, for example a thermoplastic material.

Buckle 20 comprises a base 21 attached to strand 40 and an opening 22 designed to receive end 62 of strap 60. Buckle 30 comprises a base 31 which is fixed to strand 50 and an opening 32 designed to receive end 63 of strap 60.

Each buckle 20 and 30 is designed to allow strap 60 to be moved through opening 22 or 32 towards member 10, and to prevent strap 60 from moving in a direction opposite to member 10. As a result, strap 60 is tightened in buckles 20 and 30, which prevent it from relaxing.

Each strand 40 and 50 is made from a rigid, inelastic material under normal temperature and pressure conditions (NTPC). The material of strands 40 and 50 is chosen based on a compromise between strength and flexibility. Strands 40 and 50 can be made from a plastic, metal, composite or woven material, or any other material suitable for the targeted application.

According to a preferred embodiment, buckle 20 and strand 40 form a single piece, and buckle 30 and strand 50 also form a single piece. For example, these pieces are made of a thermoplastic material.

Strand 40 extends between two ends 41 and 42 connected by a running part 43. Likewise, strand 50 extends between two ends 51 and 52, connected by a running part 53. Ends 41 and 51 are secured to member 10, more specifically, sections 12 and 13, respectively. Ends 42 and 52 are attached to buckles 20 and 30, more specifically, to bases 21 and 22, respectively.

Preferably, ends 41 and 51 are fixed to component 10 by overmolding. In other words, member 10 is overmolded on ends 41 and 51 of the strands 40 and 50.

Also preferably, ends 42 and 52 are integrated with bases 21 and 31 of the buckles 20 and 30, as mentioned above. Alternatively, buckles 20 and 30 can be attached to strands 40 and 50 by any other means, for example, overmolded on ends 42 and 52.

Figure 4:
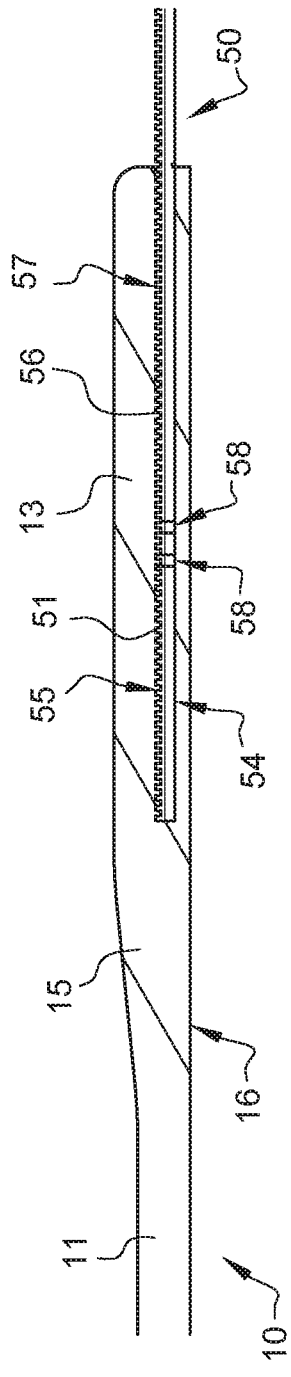
FIG. 4 is a larger scale view of the detail IV in FIG. 2.
Figure 5:
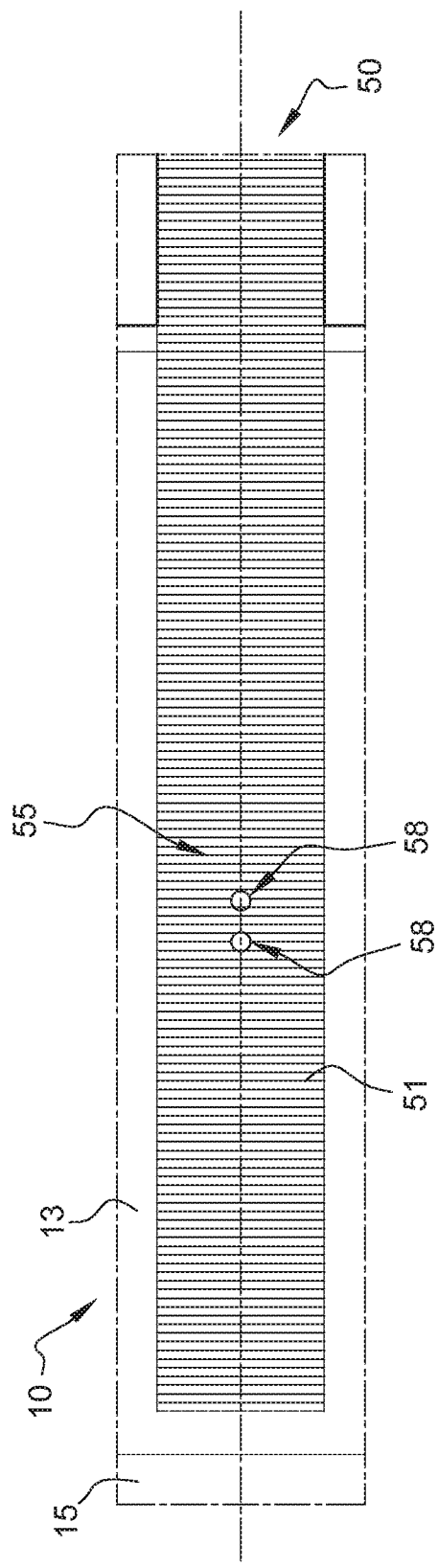
FIG. 5 is a larger scale view of the detail V in FIG. 3.

As depicted in FIGS. 4 and 5, for strand 50, end 51 comprises a smooth surface 54 and a crenellated face 55. Face 55 comprises a relief made up of alternating protruding slots 56 and hollow recesses 57 between slots 56. Recesses 57 receive the material of the member 10 during overmolding, which makes it possible to create a rigid link between member 10 and strand 20.

Alternatively, or in addition, end 51 may comprise other means of attachment to component 10. For example, end 51 may have one or more holes 58 crossing between faces 56 and 57, which may be smooth or raised. The material of member 10 is then received in these orifices 58 during overmolding. Other securing means can be implemented without departing from the scope of the invention.

The explanations provided above for end 51 are also valid for end 41.

Figure 7:
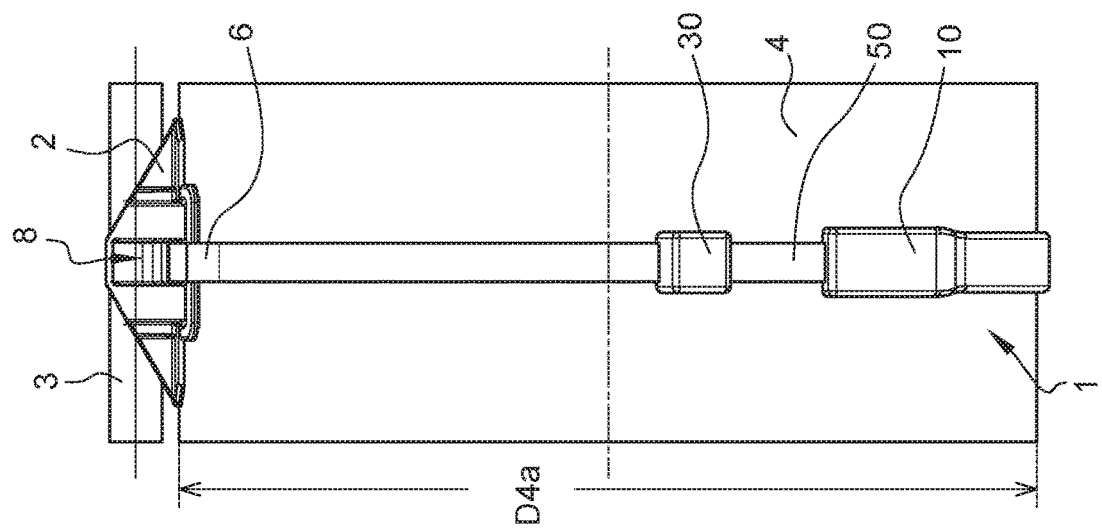
FIG. 7 is a side view according to arrow VII from FIG. 6
Figure 6:
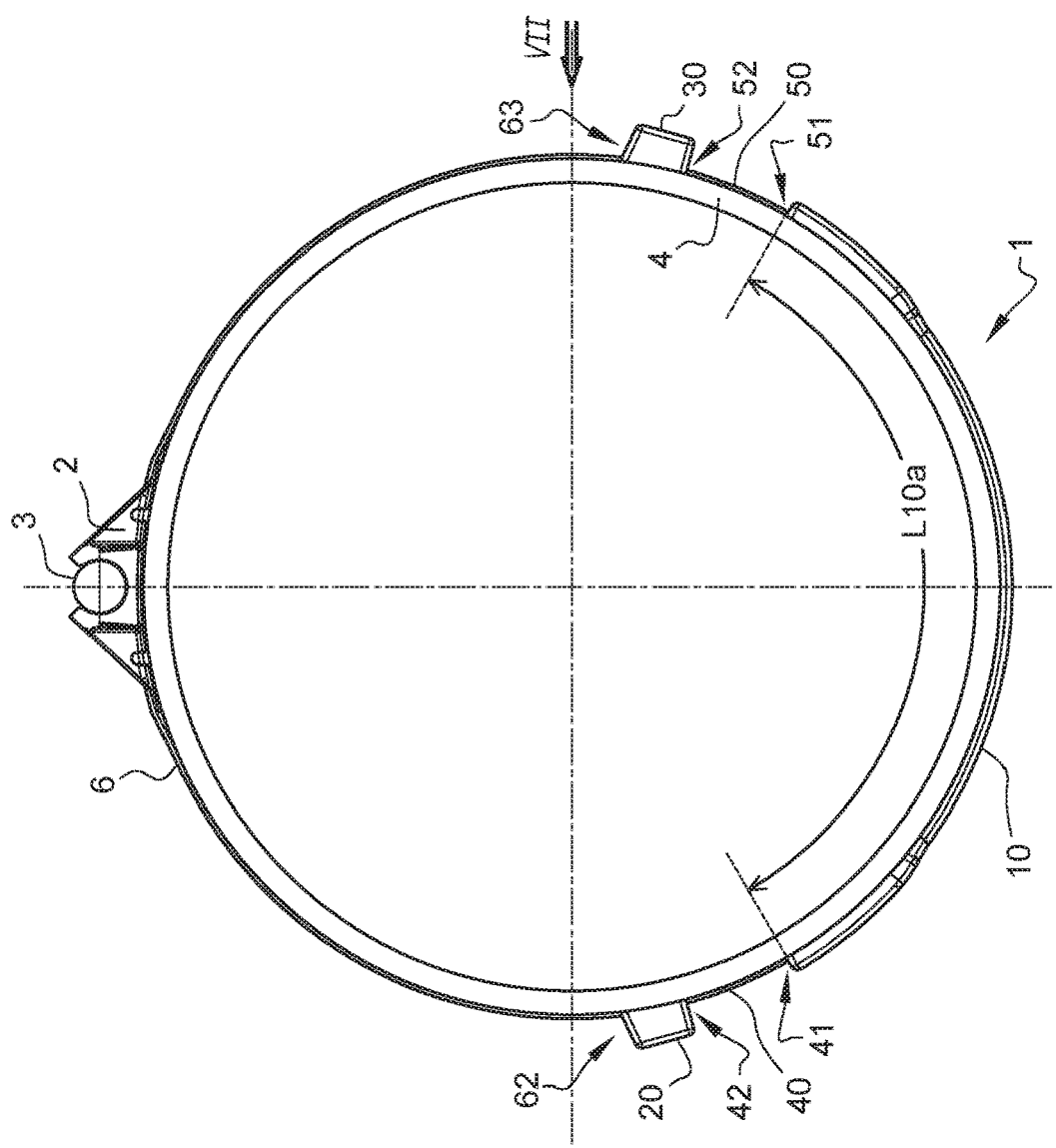
FIG. 6 is a front view of an installation according to the invention, comprising the fastening device and the strap constituting the securing system, a cylindrical pipe, a support element secured to the pipe, and a cable fastened to the support element.

FIGS. 6 and 7 show the securing of element 2 to the pipe 4, which initially has a diameter of D4a. Strap 6 is first passed through the opening 8 formed in element 2. The device 1 and the strap 6 are positioned around pipe 4, then ends 62 and 63 of strap 6 are housed in buckles 20 and 30. The device 1 and the strap 6 are then tensioned around the pipe 4, by tightening strap 6 in buckles 20 and 30. Element 2 is then pressed by strap 6 against pipe 4. The tensile strength exerted by the strands 40 and 50 on portions 12 and 13 causes the elongation of the member 10. At this stage, the member 10 has a length L10a greater than its length L10 at rest.

FIGS. 8 and 9 show the shrinking of pipe 4 over time. Its diameter D4a decreases to a diameter D4b. As an example, after 25 years submerged, the diameter D4b may reach 90% of the diameter D4a. Due to its elasticity properties, the member 10 gradually shrinks while accompanying the shrinkage of the pipe 4. Therefore, device 1 and strap 6 remain under tension, and element 2 remains pressed against pipe 4. The member 10 then has a length L10b smaller than its initial length L10a, but greater than its length L10 at rest.

Thus, the invention makes it possible to compensate for the loss of tension in strap 6 due to the shrinkage of pipe 4, and to keep element 2 secured on pipe 4. Compensating member 10 makes it possible to provide flexibility and elasticity to the 1+6 securing system compared with a securing system consisting only of a rigid strap.

In addition, device 1, system 1+6 and installation 1+2+3+4+6 may be arranged differently from FIGS. 1 to 9 without compromising the scope of the invention, as defined by the Claims. Moreover, the technical characteristics of the various embodiments mentioned above can, as a whole or in part, be combined with each other. Thus, the device 1 may be adapted in terms of cost, functionalities and performance.

What is claimed is:

1. A method of implementing a securing system (1, 6);
   a) providing the securing system (1, 6); wherein the securing system comprises:
      a device (1) for securing an element (2) on a pipe (4), said device (1) comprises:
      a compensating member (10) made of an elastic material, extensible when said device (1) is tensioned around said pipe (4) with a strap (6), and progressively shrinkable over time to keep said device (1) and said strap (6) in tension when said pipe (4) shrinks;
      two clamping buckles (20; 30) each designed to receive a free end (62, 63) of said strap (6); and
      two strands (40, 50) made of a material less elastic than said compensating member (10), each extending between a first end (41, 51) integral with said compensating member (10) and a second end (42, 52) integral with one of clamping buckles (20, 30), and
      said strap (6) is designed to cooperate with said device (1) for securing said element (2) to said pipe (4),
   b) assembling said securing system (1, 6) around said pipe (4), by placing said free ends (62, 63) of said strap (6) in said clamping buckles (20, 30) of said device (1);
   c) tightening said device (1) and said strap (6) around said pipe (4), thereby stretching said compensating member (10); and
   d) when said pipe (4) gradually shrinks over time, said compensating member (10) also shrinks, so that said device (1) and said strap (6) are held in tension around said pipe (4).

2. A method of implementing a securing system (1, 6);
   a) providing the securing system (1, 6), wherein the securing system comprises:
      a plurality of a device (1) for securing an element (2) on a pipe (4), said device (1) comprises:
      a compensating member (10) made of an elastic material, extensible when said device (1) is tensioned around said pipe (4) with a strap (6), and progressively shrinkable over time to keep said device (1) and said strap (6) in tension when said pipe (4) shrinks;
      two clamping buckles (20, 30) each designed to receive a free end (62, 63) of said strap (6); and
      two strands (40, 50) made of a material less elastic than said compensating member (10), each extending between a first end (41, 51) integral with said compensating member (10) and a second end (42, 52) integral with one of clamping buckles (20, 30),
      said strap (6) is designed to cooperate with said device (1) for securing said element (2) to said pipe (4), and said strap (6) is part of a strap roll,
   b) assembling said securing system (1, 6) around said pipe (4), by placing each one of said free ends (62, 63) of said strap (6) in one of said clamping buckles (20, 30);
   c) tightening said device (1) and said strap (6) around said pipe (4), thereby stretching said compensating member (10); then
   d) when said pipe (4) gradually shrinks over time, said compensating member (10) also shrinks, so that said device (1) and said strap (6) are held in tension around said pipe (4).

3. The method of claim 1, further comprising:
   providing a plurality of said device (1);
   wherein said strap (6) is part of a strap roll.

4. The method of claim 1, wherein the compensating member (10) is overmolded on said first ends (41, 51) of the strands (40, 50).

5. The method of claim 1, wherein said strands (40; 50) have recesses (57, 58) receiving material from said compensating member (10) during overmolding.

6. The method of claim 1, wherein each of said clamping buckles (20, 30) and an associated one of said two strands (40, 50) form a single piece.

7. The method of claim 1, wherein said device (1) solely comprises said compensating member (10), said two clamping buckles (20, 30) designed to receive said strap (6), and said two strands (40, 50).

8. The method of claim 1, wherein in a longitudinal direction of said device (1) at rest, each of said two strands (40, 50) is shorter than said compensating member (10).

9. The method of claim 2, wherein the compensating member (10) is overmolded on said first ends (41, 51) of said strands (40, 50).

10. The method of claim 2, wherein said strands (40; 50) have recesses (57, 58) receiving material from said compensating member (10) during overmolding.

11. The method of claim 2, wherein each of said clamping buckles (20, 30) and an associated one of said two strands (40, 50) form a single piece.

12. The method of claim 2, wherein said device (1) solely comprises said compensating member (10), said two clamping buckles (20, 30) designed to receive said strap (6), and said two strands (40, 50).

13. The method of claim 2, wherein in a longitudinal direction of said device (1) at rest, each of said two strands (40, 50) is shorter than said compensating member (10).

* * * * *